United States Patent
Weichel et al.

(10) Patent No.: US 6,223,528 B1
(45) Date of Patent: May 1, 2001

(54) HYDRODYNAMIC TORQUE CONVERTER WITH AN EXTENSION OF ONE WALL OF A WHEEL

(75) Inventors: Detlev Weichel; Christoph Sasse, both of Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/239,219

(22) Filed: Jan. 28, 1999

(30) Foreign Application Priority Data

Jan. 28, 1998 (DE) ................................ 198 03 173

(51) Int. Cl.⁷ .................................................. F16D 33/00
(52) U.S. Cl. ................................................. 60/367
(58) Field of Search ........................ 60/367, 330

(56) References Cited

U.S. PATENT DOCUMENTS 2,660,957 * 12/1953 Koskinen ................................ 60/367

FOREIGN PATENT DOCUMENTS

649974 * 10/1962 (CA) .
41 21 586  1/1993 (DE) .............................. F16H/45/02

* cited by examiner

Primary Examiner—Edward K. Look
Assistant Examiner—Thomas E. Lazo
(74) Attorney, Agent, or Firm—Cohen, Pontani, Lieberman & Pavane

(57) ABSTRACT

A hydrodynamic torque converter is constructed with a converter circuit which comprises at least an impeller wheel, a turbine wheel and a stator wheel. An inner wall connecting the individual blades is provided at both the impeller wheel and at the turbine wheel. The inner walls form an inner torus. The radially inner ends or the radially outer ends of the inner walls have extensions axially toward the other wheel. The extension of the front one of these walls, considered in the direction of flow, has a lengthening extending toward the other wheel, by which lengthening the extension overlaps the extension at the other wheel by a predetermined axial length with a predetermined radial offset in the direction of flow.

1 Claim, 1 Drawing Sheet

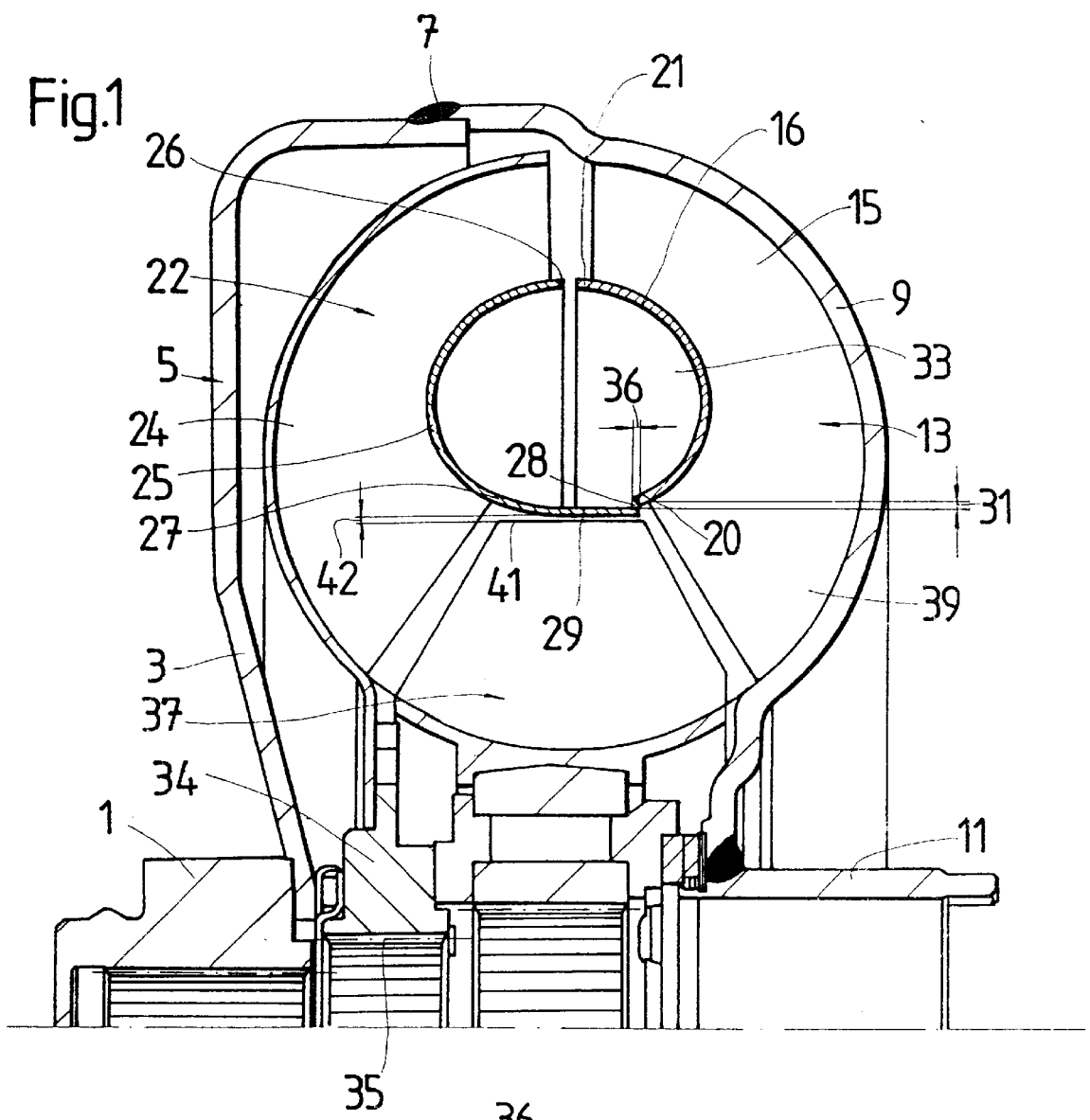
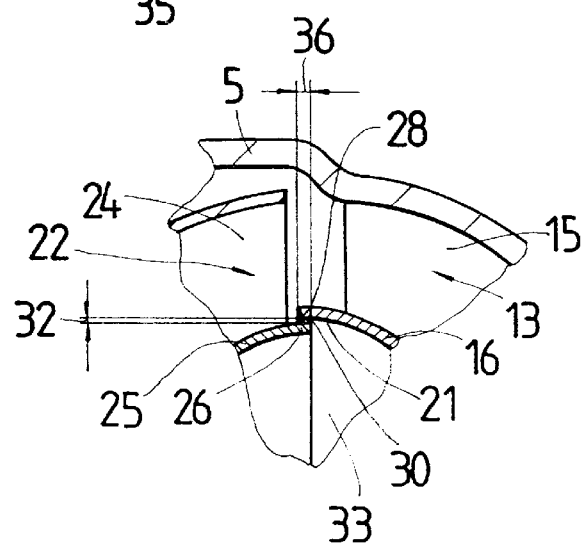

HYDRODYNAMIC TORQUE CONVERTER WITH AN EXTENSION OF ONE WALL OF A WHEEL

BACKGROUND OF THE INVENTION

1. Field of the Invention

The invention is directed to a hydrodynamic torque converter with a converter circuit having an impeller wheel, a turbine wheel and a stator wheel, with each of the impeller wheel and the turbine wheel having an inner wall connecting the individual blades of the wheels and which forms an inner torus with the other inner wall and each inner wall having an extension extending toward the other wheel.

2. Description of the Related Art

A torque converter having inner walls with extensions is known, for example, from FIG. 4 of reference DE 41 21 586 A1. This prior art device has a converter circuit with an impeller wheel, a turbine wheel and a stator wheel, wherein the individual blades at the impeller wheel and at the turbine wheel are connected with one another in an identical manner at their free ends by an inner wall. The inner walls which together form an inner torus have, at their radial outer side and radial inner side, an extension located opposite to the blades, wherein the extension extends essentially axially toward the other respective wheel. The axial distance between the two extensions is smaller on the radial outer side of these walls than on the radial inner sides. The extensions on the radially inner side are arranged to be close in the radial direction to a cover ring connecting the free ends of the blades of the stator wheel with one another.

Because of the inflation or swelling of the converter during operation caused by centrifugal force, the axial distance between the extensions of the two walls must be large enough to prevent an unwanted grinding contact. However, experience shows that a disadvantage of a large axial distance of this kind includes a decrease in hydrodynamic characteristic value, since there is an interruption in the flow guidance which leads to separation and therefore to whirling in the flow. A poorer efficiency and a lower transmission ratio result. This problem may be reduced in the radial inner region by the cover ring, but this increases the quantity of structural component parts, the manufacturing effort and the weight of the torque converter; moreover, the flow cross section for the converter fluid is reduced.

SUMMARY OF THE INVENTION

It is the object of the invention to construct a hydrodynamic torque converter in such a way that minimum whirling of the current is ensured with a maximum flow cross section.

According to the invention, this object is met by lengthening one of the extensions of the front inner wall toward the other wheel so that the lengthened extension overlaps the corresponding extension at the other wheel. By constructing the extension of the front wall, considered in the direction of flow, of a wheel, such as the impeller wheel or turbine wheel, with a lengthening extending to the other wheel and overlapping the extension at the other wheel by a predetermined axial length with a predetermined radial offset in the direction of flow, the hydrodynamic torque converter can swell in its operating phase without causing a change in the flow conditions. The result is, rather, that the flow coming from the other respective wheel is conducted by the lengthening over the extension following in the flow direction, so that the flow immediately behind this extension accumulates at the outer side of the corresponding wall and can continue to flow at this location, as well as in the area of the lengthening and in the area of the wall previously receiving the flow, without separation or whirling. This results in a very high efficiency and large transmission ratio. This step may also be implemented at the radial outer sides of the walls of the impeller wheel and turbine wheel, wherein the lengthening is located at the extension of the wall of the impeller wheel and approaches the extension of the turbine wheel from the outside with a radial gap.b driving means for driving an elastic element of the torsional vibration damper. However, the effect is greater at the radial inner sides of the walls when the lengthening is provided at the extension of the turbine wheel and approaches the extension of the impeller wheel from the inside with a radial gap. The reason for this is that the requirement for a cover ring at the free ends of the blades of the stator wheel is eliminated because of the flow between the turbine wheel and impeller wheel which is optimized in this way, so that an unrestricted flow cross section is provided for the converter fluid without having to tolerate any disadvantages with respect to fluid mechanics. Further, less material is required due to the omission of the cover ring resulting in a considerable reduction in manufacturing effort and cost because, when a cover ring of this type is present, this same cover ring should be connected with each of the blades provided at the stator wheel.

A very good sealing of the hydrodynamic circuit relative to the inner torus is provided in that the lengthening approaches close to the associated extension of the other respective wheel with a radial gap. This, in turn, leads to a further improvement in dynamic transmission characteristics.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

FIG. 1 is a longitudinal sectional view showing the upper half of a hydrodynamic torque converter according to an embodiment of the invention with a lengthening of an extension of an inner wall connecting the blades of the turbine wheel; and FIG. 2 is a longitudinal sectional view showing a radially outer area of the inner walls of the impeller wheel and turbine wheel which connect the blades of the wheels, with a lengthening at the radially outer extension of the wall of the impeller wheel.

DETAILED DESCRIPTION OF THE PRESENTLY PREFERRED EMBODIMENTS

FIG. 1 shows a hydrodynamic torque converter with a bearing journal 1 on the drive side. A primary flange 3 extends radially outside from the bearing journal 1. A radially outer portion of this primary flange 3 is fastened by a weld 7 to an impeller shell 9. The primary flange 3 and the impeller shell 9 together form a converter housing 5. On the driven side of the torque converter, a hub 11 is fastened to the impeller shell 9. The hub 11 is mounted in a gear unit, not shown, and drives a pump or impeller for supplying the torque converter with converter fluid.

An impeller wheel 13 of the hydrodynamic torque converter includes impeller blades 15 connected with one another at their free ends by a wall 16 and fastened in the impeller shell 9. An extension 20 of the wall 16 projects toward the drive side at a radially inward end of the wall 16 and another extension 21 of the wall 16 extends toward the drive side at the radially outward end of the wall 16. A turbine wheel 22 mounted on a turbine hub 34 is provided at an axial distance from the impeller wheel 13. The turbine hub 34 is connected, in a manner known per se and therefore not shown, via an inner toothing 35 with a transmission input shaft, not shown, so as to be fixed with respect to rotation relative to it. The turbine wheel 22 likewise has blades 24 which are connected with one another at their free ends by a wall 25. This wall 25 also has an extension 26 at the radial outer side and an extension 27 at the radial inner side which extend toward the driven side. The hydrodynamic torque converter also includes a stator wheel 37 having blades 39. The stator wheel is rotatably and axially fixedly arranged between the turbine hub 34 and the hub 11.

The extension 27 at the radially inner end of the wall 25 has a lengthening 29 which extends toward the impeller wheel 13. The lengthening 29 extends with its radial inner side substantially parallel to the free ends of the blades 39 of the stator wheel 37. The lengthening 29 extends axially toward the impeller wheel 13 far enough so that it has a radial offset 28 relative to the extension 20 of the wall 16 of the impeller wheel 13 and overlaps this extension 20 by an axial length 36 which is predetermined. The axial overlap between the lengthening 29 and the extension 20 prevents the formation of an axial gap that is caused by an axial deformation of the torque converter during operation, which is conventionally referred to as "swelling". The greater the degree of axial overlap achieved in this way between the lengthening 29 and the extension 20, the less harmful the effects on the flow state. In a preferred embodiment, in favor of trouble-free flow when the radial offset 28 between the extension 20, the lengthening 29 is limited to the magnitude of a gap 31. The lengthening 29 should also approach inwardly close to the free ends 41 of the blades 39 of the stator wheel 37 up to a gap 42. With gaps 31 and 41 of minimal radial extension, it is ensured that converter fluid which flows along the radial inner side of an inner torus 33 formed by the walls 16 and 25 flows axially through the blades 39 of the stator wheel 37 with minimal turbulence and therefore without interference and can subsequently reach the outer region of the wall 16. A maximum flow cross section is available for the converter fluid in the region of the blades 39 due to the absence of a cover ring for the blades 39. That is, when the lengthening 29 approaches the free ends 41 of the blades 39 up to a gap 42, the requirement for a cover ring on the blades 39 of the stator wheel 37 is eliminated.

The construction of a lengthening 29 at an extension 27, as was described in the preceding, is especially large in radial proximity to the stator wheel 37. However, it should be mentioned that the construction of a lengthening 30, according to FIG. 2, at the extension 21 of the wall 16 in the radial outer area of the inner torus 33 is also advantageous because, in this way, the flow can also be effectively prevented from entering the inner torus 33 and accordingly reducing the efficiency of the torque converter. In the latter case, the lengthening 30 should have a radial offset 28 relative to the extension 26 of the wall 25 having the width of a gap 32. At the same time, it is advantageous when the lengthening 30 overlaps the extension 26 by an axial length 36, so that even in the event of swelling of the torque converter during operation, no axial gap will occur through which converter fluid could flow into the inner torus 33. This also provides for a low-turbulence flow configuration in the radial outer area of the inner torus 33.

The invention is not limited by the embodiments described above which are presented as examples only but can be modified in various ways within the scope of protection defined by the appended patent claims.

We claim:

1. A hydrodynamic torque converter with a converter circuit, comprising:

an impeller wheel rotatable about an axis of rotation and having an impeller shell connected to an impeller hub, blades connected to said impeller shell and an impeller inner wall connecting free ends of said blades, said impeller inner wall having a radially inner end and a radially outer end;

a turbine wheel rotatable about said axis of rotation and relative to said impeller wheel having a turbine shell connected to a turbine hub, blades connected to said turbine shell and a turbine inner wall connecting free ends of said blades, said turbine inner wall having a radially inner end and a radially outer end; and a stator wheel rotatable about said axis of rotation and axially fixedly mounted between said turbine hub and said impeller hub;

said turbine inner wall and said impeller inner wall forming an inner torus; and said turbine inner wall having a radially inner turbine wheel extension at said radially inner end and a radially outer turbine wheel extension at said radially outer end of said turbine inner wall extending axially toward said impeller wheel and said impeller inner wall having a radially inner impeller wheel extension at said radially inner end and a radially outer impeller wheel extension at said radially outer end of said impeller inner wall extending axially toward said turbine wheel, said radially inner turbine wheel extension comprising a radially inner lengthening overlapping said radially inner impeller wheel extension by a first axial length in a direction of flow of the converter circuit with a first radial offset comprising a first radial gap, and said radially outer impeller wheel extension comprising a radially outer lengthening overlapping said radially outer turbine wheel extension by a second axial length in a direction of flow of the converter circuit with a second radial offset comprising a second radial gap.

* * * * *